(12) United States Patent
Repper

(10) Patent No.: US 11,900,681 B2
(45) Date of Patent: Feb. 13, 2024

(54) VISUAL MEDIA MANAGEMENT FOR MOBILE DEVICES

(71) Applicant: Brian Lawrence Repper, Fairfax, VA (US)

(72) Inventor: Brian Lawrence Repper, Fairfax, VA (US)

( * ) Notice: Subject to any disclaimer, the term of this patent is extended or adjusted under 35 U.S.C. 154(b) by 0 days.

(21) Appl. No.: 18/182,540

(22) Filed: Mar. 13, 2023

(65) Prior Publication Data

US 2023/0222800 A1  Jul. 13, 2023

Related U.S. Application Data

(63) Continuation of application No. 17/567,501, filed on Jan. 3, 2022, now Pat. No. 11,631,252.

(51) Int. Cl.
| | |
|---|---|
| *G06V 20/40* | (2022.01) |
| *H04N 5/77* | (2006.01) |
| *G06T 7/00* | (2017.01) |
| *H04W 88/02* | (2009.01) |

(52) U.S. Cl.
CPC ............ *G06V 20/48* (2022.01); *G06T 7/0002* (2013.01); *G06V 20/46* (2022.01); *H04N 5/77* (2013.01); *G06T 2207/10016* (2013.01); *G06T 2207/30168* (2013.01); *H04W 88/02* (2013.01)

(58) Field of Classification Search
CPC ...... G06V 20/48; G06V 20/46; G06T 7/0002; G06T 2207/10016; G06T 2207/30168; H04N 5/77; H04W 88/02

USPC .......................................................... 386/224
See application file for complete search history.

(56) References Cited

U.S. PATENT DOCUMENTS

| | | | | |
|---|---|---|---|---|
| 8,365,233 | B2* | 1/2013 | Kondo ............... | H04N 21/6125 |
| | | | | 725/86 |
| 8,892,572 | B2* | 11/2014 | Sanjeev .............. | G06F 16/7328 |
| | | | | 707/755 |
| 8,896,694 | B2* | 11/2014 | O'Donnell ............... | H04N 7/18 |
| | | | | 348/157 |
| 8,953,895 | B2* | 2/2015 | Kawanishi ............ | G06F 16/583 |
| | | | | 382/190 |
| 9,881,085 | B2* | 1/2018 | Tan ......................... | G06F 16/70 |
| 10,068,022 | B2* | 9/2018 | Pilpel ................... | G06F 16/9535 |
| 10,165,333 | B2 | 12/2018 | Patel et al. | |
| 10,942,816 | B1* | 3/2021 | Gu ....................... | G06F 11/1464 |
| 11,106,715 | B1* | 8/2021 | Ju .......................... | G06N 5/046 |
| 11,258,921 | B2 | 2/2022 | Holland | |
| 11,281,735 | B2* | 3/2022 | Hughes ................... | G06F 17/18 |
| 11,509,949 | B2 | 11/2022 | May, Jr. et al. | |

(Continued)

*Primary Examiner* — Helen Shibru

(57) ABSTRACT

A server includes a processor programmed to: acquire first metadata of a first media file recorded by a first mobile device; acquire second metadata of a second media file recorded by a second mobile device; determine that the first media file and the second medial file are likely recordings of the same event when a similarity exceeds a first threshold. The processor is further programmed to, when the first media file and the second medial file are likely recordings of the same event: determine, based on a comparison between the first media file and the second media file, which of the first media file and the second media file is a higher quality recording of the same event; and when the first media file is the higher quality recording, send a link to the first media file to the second mobile device.

20 Claims, 4 Drawing Sheets

(56) References Cited

U.S. PATENT DOCUMENTS

| | | | |
|---|---|---|---|
| 11,625,430 B2 * | 4/2023 | Bates | G06F 16/60 |
| | | | 707/722 |
| 11,676,383 B2 * | 6/2023 | Subramanian | G06T 7/246 |
| | | | 382/103 |
| 2003/0172114 A1 * | 9/2003 | Leung | H04L 69/32 |
| | | | 709/205 |
| 2011/0167357 A1 * | 7/2011 | Benjamin | H04M 1/72457 |
| | | | 715/753 |
| 2016/0371286 A1 | 12/2016 | Danovitz et al. | |
| 2022/0107777 A1 | 4/2022 | Magi et al. | |
| 2023/0164442 A1 * | 5/2023 | Kim | H04N 23/61 |
| | | | 348/240.99 |

* cited by examiner

VISUAL MEDIA MANAGEMENT FOR MOBILE DEVICES

CROSS-REFERENCE TO RELATED APPLICATION(S)

This is a Continuation Application of application Ser. No. 17/567,501 filed Jan. 3, 2022. The disclosure of the prior application is hereby incorporated by reference herein in its entirety.

BACKGROUND

Smartphones have become ubiquitous in many areas of the world. In most urban areas, smartphones are carried by almost every adult. The camera (i.e. photo and video recording) technology of smartphones has improved dramatically in recent years. This fact, combined with people's innate desire to take photographs has made photography with smartphones extremely popular.

The photographic capabilities, memory storage, and constant availability of smartphones have allowed people to document events to an extent never before possible. However, there are still drawbacks, and possibilities for improvement.

For one thing, the size constraints (particularly thickness) of the smartphone place meaningful limits on the zoom capabilities of the smartphone camera. Smartphone manufactures have made great strides in this area by including arrays of several different lenses with different focal lengths, and using artificial intelligence (AI) to enhance the quality of the photos. AI has been used particularly in the areas of reducing blur for shaky photos, moving objects, or photos of very distant objects. Sound quality for video recordings has also been improved by using arrays of multiple microphones, noise cancellation, and AI enhancement.

However, this does not solve all of the potential problems with recording distant objects or events. First, even with the above enhancements, distant photos are still lower quality than near photos. Second, there could be an intervening (i.e. view blocking) object between the distant object or event being recorded, and the user. Third, for video recordings, the sound quality is greatly reduced for recording distant objects and events. This is true even in view of the above-noted improvements in sound recording.

Thus far, innovators in this field have focused on improving the image/sound recording and processing capabilities of the smartphone itself to address these problems. However, there is a limit to what this approach can achieve.

SUMMARY

One aspect of the disclosure is a server that includes a processor. The processor is programmed to acquire first metadata of a first media file recorded by a first mobile device. The processor is further programmed to acquire second metadata of a second media file recorded by a second mobile device. The processor is further programmed to determine a similarity between the first media file and the second media file based on a comparison between the first metadata and the second metadata, and determine that the first media file and the second medial file are likely recordings of the same event when the similarity exceeds a first threshold. The processor is further programmed to, when the first media file and the second medial file are likely recordings of the same event: acquire the first media file and the second media file; determine, based on a comparison between the first media file and the second media file, which of the first media file and the second media file is a higher quality recording of the same event; when the first media file is the higher quality recording, send a link to the first media file to the second mobile device; and when the second media file is the higher quality recording, send a link to the second media file to the first mobile device.

In some embodiments, the first metadata and the second metadata include location and time information of the first media file and the second media file, respectively, and the processor is programmed to determine that the similarity exceeds the first threshold when the location and time information of the first media file and the second media file match.

In some embodiments, the processor is programmed to determine that the location and time information of the first media file and the second media file match when recording times of the first and second media files overlap, and locations of recording the first media file and second media file are less than a distance threshold.

In some embodiments, the processor is programmed to, after acquiring the first media file and the second media file, confirm that the first media file and the second media file are recordings of the same event by: determining a first subject of the first media file and a second subject of the second media file, by analyzing center regions of frames within the first media file and the second media file; and comparing the first subject and the second subject to determine if they are the same subject.

In some embodiments, the processor is programmed to compare the first subject and the second subject to determine if they are the same subject by: assigning keypoints to the first subject; locating the keypoints on the second subject; determining a number of the keypoints that are locatable on the second subject; and when the number of locatable keypoints exceeds a threshold, determining that the first subject and the second subject are the same subject.

In some embodiments, the processor is programmed to determine which of the first media file and the second media file is the higher quality recording of the same event by: calculating a pixel distance between the keypoints in the first media file the keypoints in the second media file; when the pixel distance is higher in the first media file, determine that the first media file is the higher quality recording; and when the pixel distance is higher in the second media file, determine that the second media file is the higher quality recording.

In some embodiments, the processor is programmed to determine which of the first media file and the second media file is the higher quality recording of the same event by: assigning a first bounding box to the first subject; assigning a second bounding box to the second subject; when the first bounding box is larger than the second bounding box, determine that the first media file is the higher quality recording; and when the second bounding box is larger than the first bounding box, determine that the second media file is the higher quality recording.

In some embodiments, the processor is programmed to analyze center regions of frames within the first media file and the second media file to determine the first subject of the first media file and the second subject of the second media file, by: identifying objects in the center regions of the frames of the first media file and the second media file; determining that the identified objects are the first subject if they are in the center regions of the frames of the first media file for a majority of a recording time of the first media file; and determining that the identified objects are the second subject if they are in the center regions of the frames of the second media file for a majority of a recording time of the second media file.

In some embodiments, the processor is programmed to, after acquiring the first media file and the second media file, confirm that the first media file and the second media file are recordings of the same event by: comparing audio recordings in the first media file and the second media file at corresponding time points; and when a similarity in the audio recordings exceeds a threshold, confirming that the first media file and the second media file are recordings of the same event.

In some embodiments, the first metadata includes a description of a first subject of the first media file, and the second metadata includes a description of a second subject of the second media file and the processor is programmed to determine that the similarity exceeds the first threshold when the descriptions of the first subject and the second subject match.

One aspect of the disclosure is a mobile device that includes a camera configured to generate an image recording. The mobile device further includes a memory configured to store the image recording and metadata of the image recording. The mobile device further includes a communicator configured to communicate on a network, and a display. The mobile device further includes a processor programmed to: instruct the communicator to send the metadata of the image recording to a networked device via the network; receive an instruction from the networked device to send the image recording to the networked device, based on a determination that the image recording and another image recording recorded by another mobile device are likely recordings of the same event because a similarity between the metadata and metadata of the other image recording exceeds a first threshold; instruct the communicator to send the image recording to the networked device; receive a link to the other image recording from the networked device via the communicator, based on a determination that the other image recording is higher quality than the image recording; and instruct the display to display the link in association with the image recording.

In some embodiments, the metadata includes location and time information of the image recording. In some embodiments, the processor is programmed to: determine a subject of the image recording by analyzing center regions of frames within the image recording; identify the subject of the image recording; and include a description of the subject of the image recording in the metadata. In some embodiments, the processor is programmed to: assign a bounding box to the subject of the image recording; and include location information of the bounding box in the metadata. In some embodiments, the processor is programmed to: assign keypoints to the subject of the image recording; and include data of the keypoints in the metadata. In some embodiments, the processor is programmed to analyze the center regions of frames within the first image recording to determine the subject of the image recording, by: identifying objects in the center regions of the frames of the image recording; and determining that the identified objects are the subject if they are in center regions of the frames of the image recording for a majority of a recording time of the image recording.

In some embodiments, the processor is programmed to: receive a second link to a second image recording from the networked device via the communicator, based on a determination that the second image recording is higher quality than the image recording; and instruct the display to display the link and the second link in association with the image recording. In some embodiments, the processor is programmed to: receive a user selection of the image recording from the display; and selectively display the link in response to the user selection of the image recording. In some embodiments, the processor is programmed to: receive a user selection of the image recording from the display; and selectively display the link and the second link in response to the user selection of the image recording. In some embodiments, the processor is programmed to: receive a user selection of the link from the display; and instruct the communicator to download the other image recording in response to the user selection of the link.

DETAILED DESCRIPTION OF EMBODIMENTS

Figure 1:
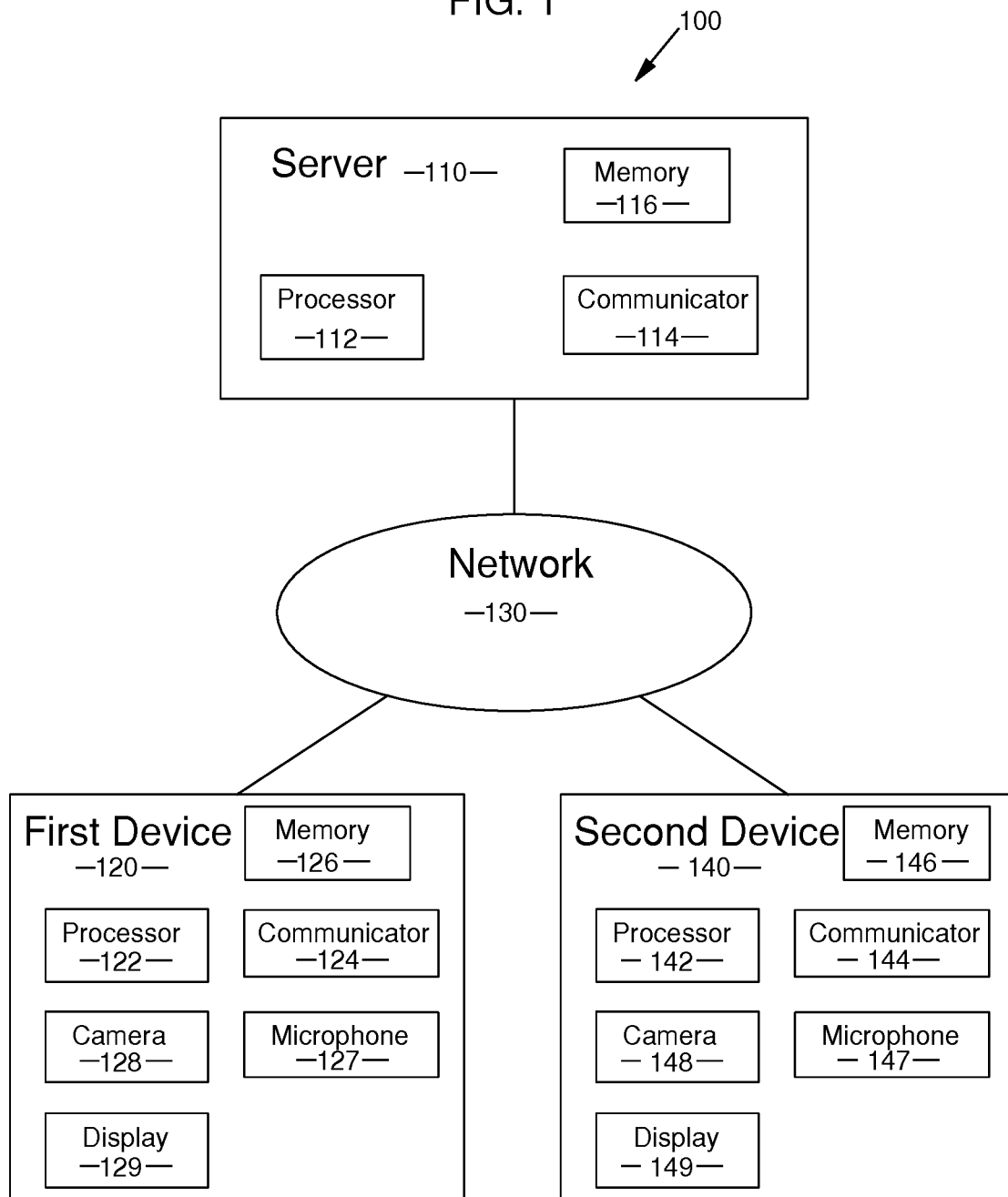
FIG. 1 is a block diagram of a system including a server according to one embodiment.

FIG. 1 is a block diagram of a system 100 including a server 110 according to one embodiment. The system 100 includes at least two devices (i.e. first device 120 and second device 140). These devices are computerized mobile devices such as smartphones, tablets, phablets, glasses, head-mounted devices, wrist-mounted devices, clothing-mounted devices, etc. Server 110 communicates with first device 120 and second device 140 via network 130. Network 130 may be a public network such as the internet, or a private network such as a local wifi network. In some embodiments, network 130 is excluded altogether and first device 120 and second device 140 (and optionally server 110) communicate using a two-way networking protocol such as Bluetooth.

Server 110 includes a processor 112, memory 116, and communicator 114. First device 120 includes a processor 122, memory 126, and communicator 124. Second device 140 includes a processor 142, memory 146, and communicator 144. The communicators 114, 124, and 144 can be e.g. network communication hardware. These components are used to perform the functions of recording real events and sharing the recordings to improve mobile device user experiences.

Figure 2:
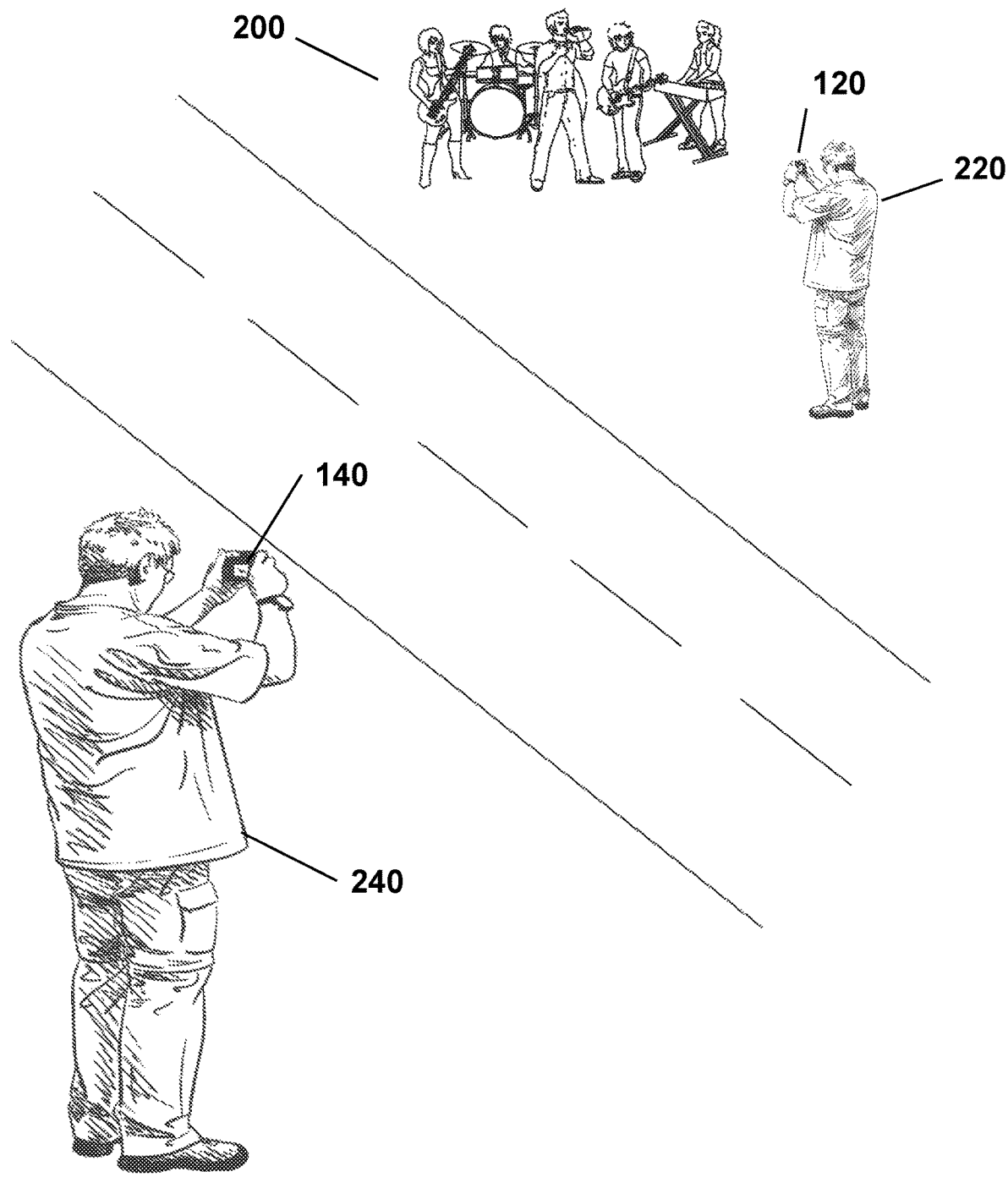
FIG. 2 is an illustration of an event being recorded using two mobile devices according to one embodiment.

For example, FIG. 2 is an illustration of an event 200 being recorded using two mobile devices (i.e. first device 120 and second device 140). In this embodiment, first user 220 is operating first device 120, and second user 240 is operating second device 140 (e.g. first and second smartphones). In this example, the event 200 is a live band playing in public. However, this event could be any event witnessed by multiple people with mobile devices. The event may be for example, an exceptional astronomical event (e.g. a large full moon, meteor, or eclipse), an accident (e.g. vehicular), a street performance, or a noteworthy event in a large-scale private gathering such as a company retreat. This system may be particularly valuable in situations where the event is interesting to those who witnessed it, but not noteworthy enough to the broader public to be well documented on the internet.

In FIG. 2, first user 220 is close to the band performance 200, and is getting relatively good quality video, audio, or photographic recording of band performance 200 on mobile device 120. On the other hand, second user 240 is across the street from the band (i.e. significantly further away) and records relatively poor quality video, audio, or photographic recording of band performance 200 on mobile device 140. This results from the fact that mobile devices generally produce lower quality recordings at relatively greater distances and higher quality recordings at relatively shorter distances to the event being recorded.

Figure 3:
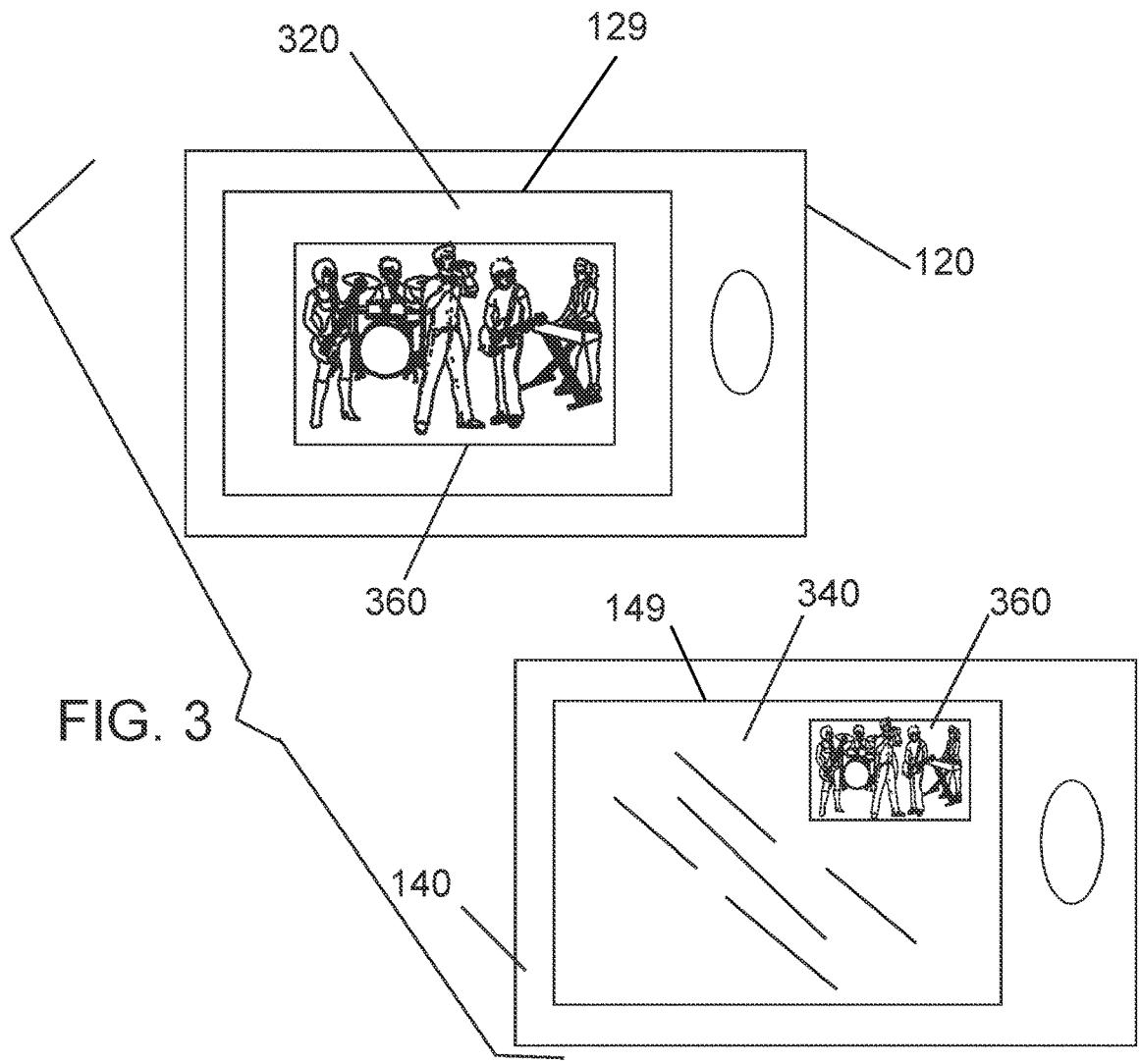
FIG. 3 is an illustration of two mobile devices playing their respective recordings of the same event.

FIG. 3 shows a comparison between a first recording 320 (i.e. the first media file, or the image recording) recorded on first mobile device 120 and the second recording 340 (i.e. the second media file, or the other image recording) recorded on second mobile device 140, and computer vision techniques used herein. As shown in FIG. 2, at event 200, first user 220 records first recording 320 using the camera 128 and/or microphone 127 of first device 120. First recording 320 is stored on memory 126 of first device 120 in association with first metadata. Also at event 200, second user 240 records second recording 340 using the camera 148 and/or microphone 147 of second device 140. Second recording 340 is stored on memory 146 of second device 140 in association with second metadata.

In the example of FIG. 3, first recording 320 is being played back or recorded on first device 120, and is being displayed on display 129 of first device 120. Similarly, second recording 340 is being played back or recorded on second device 140, and is being displayed on display 149 of second device 140. In this example, first recording 320 is of better quality than second recording 340, because it was recorded at a closer distance. However, other factors could affect the relative quality of the two recordings. For example, one of the devices could have a superior lens (e.g. long focal length or telephoto), microphone, or recording hardware/software. Alternatively, user settings such as the quality level and recording size could affect relative quality of the recordings.

The software or server 110 determines whether first recording 320 and second recording 340 are of the same event (using processor 112 and memory 116). In order to do this, server 110 reviews metadata of the first recording 320 and second recording 340 (i.e. first metadata and second metadata). This metadata is acquired via network 130 and communicator 114. In some embodiments, this metadata contains location and time information of the recordings. The location information can be obtained using GPS data from the mobile device, or wireless network location tracking. The time information can be obtained from internal clocks in the mobile device, or a time obtained over a network.

Server 110 reviews the metadata of recordings from several different mobile devices to find matches in the metadata indicating recordings of the same event. In one embodiment, the plurality of mobile devices automatically send the metadata to server 110 via network 130. In other embodiments, this is done only once user approval for the media sharing feature is obtained. In some embodiments, if first recording 320 and second recording 340 have matching location and time metadata, the algorithm considers them a preliminary match for recording the same event. A match in this situation would be overlapping or similar time metadata, and location metadata within a predetermined distance threshold (e.g. 100 meters) of each other.

In one embodiment, the preliminary match based on metadata is established by setting a threshold of similarity between the first recording 320 and the second recording 340. The server 110 compares the first metadata and the second metadata to determine the similarity between the metadata. This similarly may be calculated based on a weighted algorithm. For example, the similarity score could be proportional to an amount of recording time overlap of the two recordings, and inversely proportional to a distance between locations of the two recordings. Multipliers for these variables could also be used to weigh the scoring of the similarity of the metadata.

Additional factors other than similarity are considered when the server 110 determines the likelihood that the first recording and second recording are of the same event. Another variable that could suggest the same event is recorded in both recordings is that a Bluetooth communication occurred between first device 120 and second device 240, especially if the communication occurred near the time of the recordings. Bluetooth or other near-field communication between the devices can be performed by communicators 124 and 144 communicating with each other. The presence or absence of a Bluetooth communication between the devices could be added to a weighted calculation, along with the similarity of the metadata to determine the likelihood that the first recording and second recording are of the same event. In other words, server 110 can determine a similarity between the first media file and the second media file based on a comparison between the first metadata and the second metadata, and determine that the first media file and the second medial file are likely recordings of the same event when the similarity exceeds a first threshold.

The first threshold can be a similarity score set based on expected scores from a similarity algorithm as described later. The first threshold can be determined based on trial an error, by finding an optimal balance between false positive and false negative matches. Depending on the server resources available, it may be preferable to either raise or lower this threshold to find potential matching recordings for users.

Moreover, whether or not a Bluetooth communication occurred between the first mobile device 120 and second mobile device 140 could be used in place of location information of the recordings to determine a preliminary match. This could be done using known contact tracing techniques. Specifically, several mobile devices would report their Bluetooth (or other near-field communications) with other mobile devices to server 110. Sever 110 would determine a preliminary match in a situation where: 1) first mobile device 120 and second mobile device 140 had a near-filed communication; and 2) first mobile device 120 and second mobile device both recorded a media file within a predetermined time range of the near-field communication. The second determination would be made using the first and second metadata.

Once a preliminary match is established, server 110 instructs (via network 130 and communicator 114) first device 120 and second device 140 to send copies of first recording 320 and second recording 340 to server 110. These copies can either be in native format, or downgraded to lower their size and reduce network bandwidth usage. Upon receiving this instruction, first device 120 sends first recording 320 to server 110 (via communicator 124 and network 130). Similarly, second device 140 sends second recording 340 to server 110 (via communicator 144 and network 130).

Once server 110 obtains first recording 320 and second recording 340, server 110 compares them to determine if they are recordings of the same event 200. To do this, image recognition or computer vision techniques are used to make a final match establishing that the same event was recorded, and to establish which of the two recordings is of higher quality. For example, image recognition can be used to establish that the same objects are located in both recordings. Similarly, sound matching (i.e. hidden Markov model analysis) can be used to establish that the same sounds are in both recordings.

Known image recognition techniques are used to determine if the same event has been recorded in the first recording 320 and the second recording 340. For example, classification, tagging, object detection, and segmentation can be used. With classification, a class is assigned to the recording, and this narrows the possible matches between the recordings. With tagging, several aspects of the recording are tagged, to provide a more detailed basis for matching the two recordings. With detection, an artificial intelligence (AI) or machine learning algorithm detects specific objects or events within the recording. A bounding box 360 can be placed around objects or events of interest, which the algorithm can focus on in the recording matching process. With segmentation, an element can be located in a recording to the nearest pixel, which can precisely locate objects or events within a recording.

Figure 4:
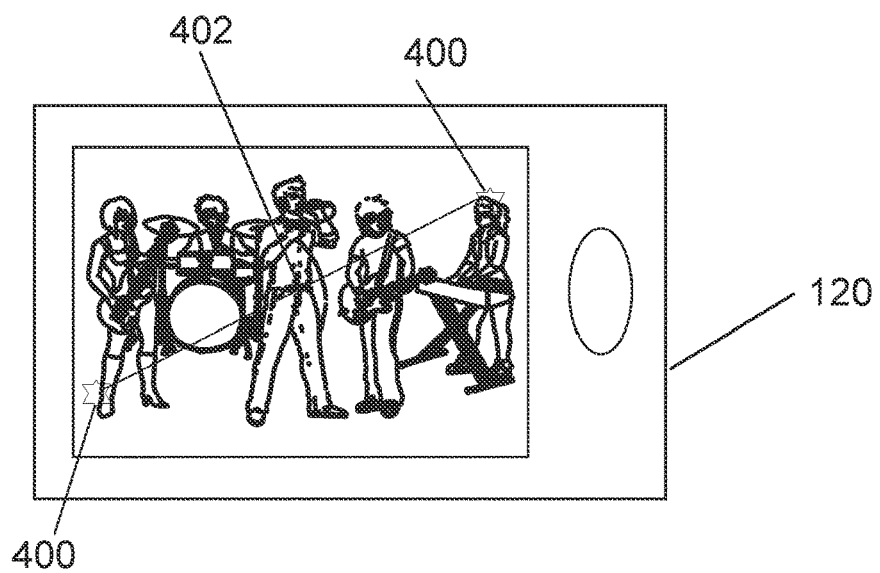
FIG. 4 is an illustration of a mobile device playing its recording of the event.

To determine which objects are the subject of the first recording 320, the algorithm can employ a several techniques, as shown in FIGS. 3 and 4. For example, the algorithm can focus on portions of the recordings near the center of the recordings for a majority of the recording time. While focusing on objects near the center of the recordings for a majority of the recording time, the algorithm can recognize objects or events of interest using keypoints 400 or bounding boxes 360. This way, the algorithm can compare the objects or events in first recording 320 and second recording 340 to determine if there is a match. For example, the algorithm can assign keypoints 400 using known techniques on an object or event deemed to be a subject of the first recording 320 (i.e. points of high contrast or unusual brightness). Then, it can search for those keypoints 400 in the second recording 340 to determine if the first recording 320 and second recording 320 are of the same event. For a video recording, the algorithm can compare frames with a same timestamp for instances of the object or event of interest.

In some embodiments, the software trains a deep learning algorithm to recognize the subject of the first recording 320. In other words, the subject of the first recording 320 is identified (e.g. using its location near the center of the recording) and tagged by the algorithm. This can be done, for example, by using the keypoints 400 and applying nearest-neighbor classification keypoints 400 and other points in the first recording 320. In particular, this classification and training can be focused near the center of the frames of the first recording 320. This way, the algorithm can be better trained to recognize the subject of the first recording in other recordings (e.g. the second recording 340).

The first recording 320 is then used as training data for an image recognition algorithm. The second recording 340 is then inputted into the trained image recognition algorithm to first identify whether the subject of the first recording 320 is located in the recording, and to determine a relative position of the second device 140 relative to the first device 120 when the recordings were made. Of course, the performance of these steps could be reversed. In the embodiments herein, first recording 320 is the superior recording. Thus, the software would ultimately perform its function by identifying first recording 340 using data training from second recording 340.

In particular, after the keypoints 400 are assigned using first recording 320, they are located in second recording 340. Next, the software determines a number of the keypoints 400 that are locatable on the subject of the second recording 340 (i.e. the second subject). To do this, the algorithm locates an area in second recording 340 where the subject is expected to be located (e.g. the center 25% of the area of one or more frames). The area in of the expected location of the subject can be the same as bounding box 360, or larger than bounding box 360. The method for determining the area of the expected second subject can be the same as the method used to determine the location of the first subject.

Once this area is determined, the algorithm attempts to locate keypoints 400 in that area. When the number of locatable keypoints exceeds a threshold, determining that the first subject (subject of the first recording 320) and the second subject are the same subject (i.e. event 200). For example, if the image recognition algorithm assigns 100 keypoints to the first subject, and can identify 75 keypoints in an area that the second subject is expected, the threshold is exceeded. Thus, it is determined that the first subject and second subject are the same subject.

In some embodiments, the mobile devices 120, 140 can locally identify keypoints 400, bounding boxes 360, areas of expected location of the subject, and/or a description of the subject using machine learning and computer vision techniques (using processors 122,142). This information can be added to the metadata. Thus, when the first metadata is sent to server 110, server 110 can use the metadata to more easily make a preliminary match between first recording 320 and second recording 340 and/or more easily make a final determination of whether the first recording 320 and second recording 340 are the same event. Thus, some of the computational resources of matching the different media files can be transferred from server 110 to mobile devices 120, 140. In other words, some of the subject identification and classification is performed by processors 122 and 142, instead of processor 112. Thus, a distributed computational approach can be taken, improving the functionality and performance of the network.

Once it is determined that first recording 320 and second recording 340 are of the same event 200, the algorithm determines which of the first recording 320 and second recording 340 is of better quality. This can be done by determining a relative size of the objects of interest in each recording. For example, if the first recording 320 has a greater distance 402 between the object keypoints 400, or a larger bounding box 360, it can be deemed the higher quality recording. The distance 402 between object keypoints 400 may be a pixel distance, which is a number of pixels between the object keypoints 400. This number of pixels can be an absolute number of pixels, or a number of pixels relative to the resolution of the recording. Alternatively or additionally, the algorithm can review the resolution, bitrate, frame rate, or other recording quality statistics when assessing the relative quality of the recordings.

The algorithm can also determine the relative quality of the first recording 320 and second recording 340 based on lighting conditions. For example, if the algorithm identifies glare and/or poor contrast in one of the recordings, it could determine that the other recording is higher quality. All of the aforementioned factors and other factors can be weighted and tallied in order to generate a quality score for each of the first recording 320 and the second recording 340.

The algorithm determines the higher quality recording based on the recording with the better score.

Once server 110 determines which of the first recording 320 and second recording 340 is of better quality, it sends a link to the device with the lower quality recording that enables access to the higher quality recording. In the embodiment of FIG. 3, first recording 320 is of better quality than second recording 340. Therefore, server 110 would send a link to first recording 320 to second device 140. An embodiment illustrating how this link is displayed to the second user 240 is shown in FIG. 5.

Figure 5:
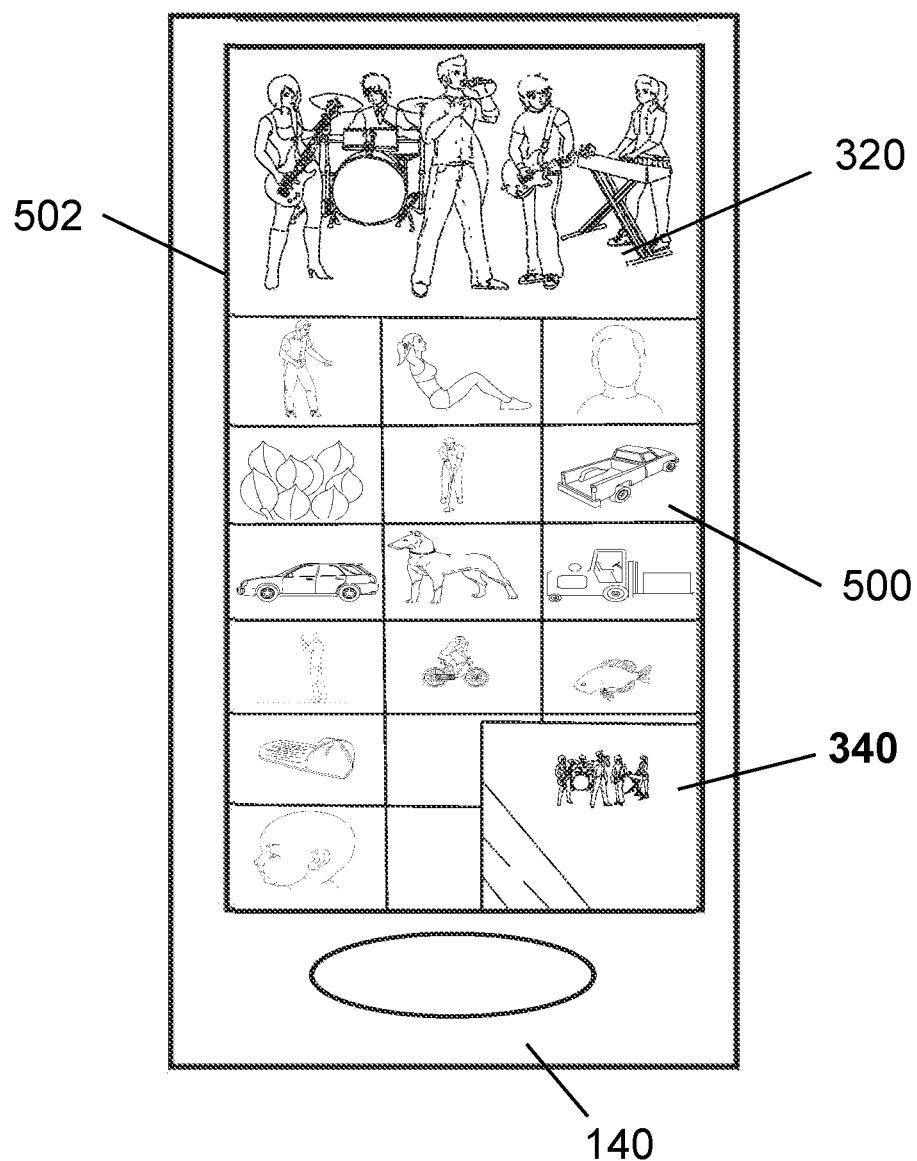
FIG. 5 is an illustration of a user interface for viewing media files according to one embodiment.

FIG. 5 shows a user interface for using the software according to embodiments herein. In FIG. 5, the second user's photo album 500 is open and being viewed as a plurality of tiles of photos and videos on second mobile device 140. In this embodiment, second mobile device 140 is being used, and second recording 340 of the event is located in the photo album. Second recording 340 (or an icon thereof) is being selected by the second user 240 and appears larger than other media icons in photo album 500. Above photo album 500, a related media pane 502 is displayed. In this media pane, an icon representing first recording 320 is displayed simultaneously with second recording 340 being selected by the second user 240. Although the software has already determined that first recording 320 is a better (i.e. higher quality) recording than second recording 340 of the event, second user 240 can decide whether or not first recording 320 is desirable for viewing.

In some embodiments, although the icon for first recording 320 is displayed on the second mobile device 140, the full file is not transferred to that device until the first recording 320 is selected by the second user 240 for viewing. The icon of first recording 320 can be shown as a preview of the recording, either as a still frame or video icon. In some embodiments, the first recording 320 can be streamed by the second user 240 for viewing; in other embodiments, the first recording 320 can be downloaded to second mobile device 140.

In some embodiments, multiple other recordings of the event recorded in second recording 340 are identified by the software as higher quality than second recording 340, and multiple icons (i.e. multiple links) corresponding to those recordings are displayed in the related media pane 502. These multiple higher quality recordings can be from multiple different mobile devices. The software may choose a variety of different recordings of the same event from different vantage points, in order to give the second user 240 many options for viewing the event to select a favorite recording.

Embodiments of the server and mobile device described herein improve the functioning of the computer network by providing desired media to users of the mobile devices. To do this, the various embodiments use analysis techniques limited to the realm of computer technology, such as metadata and machine learning. Moreover, this media is recorded and distributed using computer hardware such as cameras, processors, memory, and network communication hardware. Finally, the problem of poor quality media recordings on mobile devices being addressed herein is a problem limited to the realm of computer technology. Thus, embodiments herein are necessarily rooted in computer technology in order to overcome a problem specifically arising in the realm of computer networks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server (e.g. the cloud). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. Such processor can include processor 112, processor 122, and processor 124.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

Although the invention has been described with reference to embodiments herein, those embodiments do not limit the scope of the invention. Modifications to those embodiments or different embodiments may fall within the scope of the invention.

Parts List:
100 System
110 Server
112 Processor (Server)
114 Communicator (Server)
116 Memory (Server)
120 First Device
122 Processor (First Device)
124 Communicator (First Device)
126 Memory (First Device)
127 Microphone (First Device)
128 Camera (First Device)
129 Display (First Device)
130 Network
140 Second Device
142 Processor (Second Device)
144 Communicator (Second Device)
146 Memory (Second Device)
147 Microphone (Second Device)
148 Camera (Second Device)
149 Display (Second Device)
200 Event
220 First User
240 Second User
320 First Recording
340 Second Recording
360 Bounding Box
400 Keypoints
402 Keypoint Distance
500 Photo Album
502 Related Media Pane

What is claimed is:

1. A server comprising:
a memory; and
at least one processor connected to the memory and programmed to:
acquire a first media file and first metadata of the first media file;
acquire a second media file and second metadata of the second media file;
store the first media file, the first metadata, the second media file, and the second metadata in the memory;
determine a similarity between the first media file and the second media file based on a comparison between the first metadata and the second metadata;
determine that the first media file and the second media file are likely recordings of the same event when the similarity exceeds a first threshold; and
in response to a determination that the first media file and the second media file are likely recordings of the same event:
confirm that the first media file and the second media file are recordings of the same event by:
determining a first subject of the first media file and a second subject of the second media file, by analyzing center regions of frames within the first media file and the second media file; and
comparing the first subject and the second subject to determine if they are the same subject;
determine, based on a comparison between the first media file and the second media file, which of the first media file and the second media file is a higher quality recording of the same event; and
when the second media file is the higher quality recording, send a link to the second media file to a mobile device displaying the first media file, a link to the first media file, or a preview of the first media file.

2. The server of claim 1, wherein the first metadata and the second metadata include location and time information of the first media file and the second media file, respectively, and the at least one processor is programmed to determine that the similarity exceeds the first threshold when the location and time information of the first media file and the second media file match.

3. The server of claim 2, wherein the at least one processor is programmed to determine that the location and time information of the first media file and the second media file match when recording times of the first and second media files overlap, and locations of recording the first media file and second media file are less than a distance threshold.

4. The server of claim 1, wherein the at least one processor is programmed to compare the first subject and the second subject to determine if they are the same subject by:
   assigning keypoints to the first subject;
   locating the keypoints on the second subject;
   determining a number of the keypoints that are locatable on the second subject; and
   when the number of locatable keypoints exceeds a threshold, determining that the first subject and the second subject are the same subject.

5. The server of claim 4, wherein the at least one processor is programmed to determine which of the first media file and the second media file is the higher quality recording of the same event by:
   calculating a pixel distance between the keypoints in the first media file and the keypoints in the second media file; and
   when the pixel distance is higher in the second media file, determining that the second media file is the higher quality recording.

6. The server of claim 1, wherein the at least one processor is programmed to determine which of the first media file and the second media file is the higher quality recording of the same event by:
   assigning a first bounding box to the first subject;
   assigning a second bounding box to the second subject; and
   when the second bounding box is larger than the first bounding box, determining that the second media file is the higher quality recording.

7. The server of claim 1, wherein the at least one processor is programmed to analyze the center regions of the frames within the first media file and the second media file to determine the first subject of the first media file and the second subject of the second media file, by:
   identifying objects in the center regions of the frames of the first media file and the second media file;
   determining that the identified objects are the first subject if they are in the center regions of the frames of the first media file for a majority of a recording time of the first media file; and
   determining that the identified objects are the second subject if they are in the center regions of the frames of the second media file for a majority of a recording time of the second media file.

8. The server of claim 1, wherein the at least one processor is programmed to, after acquiring the first media file and the second media file, confirm that the first media file and the second media file are recordings of the same event by:
   comparing audio recordings in the first media file and the second media file at corresponding time points; and
   when a similarity in the audio recordings exceeds a threshold, confirming that the first media file and the second media file are recordings of the same event.

9. The server of claim 1, wherein the first metadata includes a description the first subject, and the second metadata includes a description of the second subject, and the at least one processor is programmed to determine that the similarity exceeds the first threshold when the description of the first subject and the description of the second subject match.

10. The server of claim 1, wherein the at least one processor is programmed to:
    in response to the link to the second media file being selected, send the second media file to the mobile device.

11. A device comprising:
    a memory configured to store:
       a first media file;
       first metadata of the first media file;
       a second media file; and
       second metadata of the second media file;
    a display; and
    at least one processor connected to the memory and the display, the at least one processor being programmed to:
       determine a similarity between the first media file and the second media file based on a comparison between the first metadata and the second metadata;
       determine that the first media file and the second media file are likely recordings of the same event when the similarity exceeds a first threshold; and
       in response to a determination that the first media file and the second media file are likely recordings of the same event:
          confirm that the first media file and the second media file are recordings of the same event by:
             determining a first subject of the first media file and a second subject of the second media file, by analyzing center regions of frames within the first media file and the second media file; and
             comparing the first subject and the second subject to determine if they are the same subject;
          determine, based on a comparison between the first media file and the second media file, which of the first media file and the second media file is a higher quality recording of the same event;
          when the first media file is the higher quality recording, instruct the display to display a link to the first media file; and
          when the second media file is the higher quality recording, instruct the display to display a link to the second media file.

12. The device of claim 11, wherein the first metadata and the second metadata include location and time information of the first media file and the second media file, respectively, and the at least one processor is programmed to determine that the similarity exceeds the first threshold when the location and time information of the first media file and the second media file match.

13. The device of claim 12, wherein the at least one processor is programmed to determine that the location and time information of the first media file and the second media file match when recording times of the first and second media files overlap, and locations of recording the first media file and second media file are less than a distance threshold.

14. The device of claim 11, wherein the at least one processor is programmed to compare the first subject and the second subject to determine if they are the same subject by:
    assigning keypoints to the first subject;
    locating the keypoints on the second subject;
    determining a number of the keypoints that are locatable on the second subject; and
    when the number of locatable keypoints exceeds a threshold, determining that the first subject and the second subject are the same subject.

15. The device of claim 14, wherein the at least one processor is programmed to determine which of the first media file and the second media file is the higher quality recording of the same event by:
calculating a pixel distance between the keypoints in the first media file and the keypoints in the second media file;
when the pixel distance is higher in the first media file, determining that the first media file is the higher quality recording; and
when the pixel distance is higher in the second media file, determining that the second media file is the higher quality recording.

16. The device of claim 11, wherein the at least one processor is programmed to determine which of the first media file and the second media file is the higher quality recording of the same event by:
assigning a first bounding box to the first subject;
assigning a second bounding box to the second subject;
when the first bounding box is larger than the second bounding box, determining that the first media file is the higher quality recording; and
when the second bounding box is larger than the first bounding box, determining that the second media file is the higher quality recording.

17. The device of claim 11, wherein the at least one processor is programmed to analyze the center regions of the frames within the first media file and the second media file to determine the first subject of the first media file and the second subject of the second media file, by:
identifying objects in the center regions of the frames of the first media file and the second media file;
determining that the identified objects are the first subject if they are in the center regions of the frames of the first media file for a majority of a recording time of the first media file; and
determining that the identified objects are the second subject if they are in the center regions of the frames of the second media file for a majority of a recording time of the second media file.

18. The device of claim 11, wherein the at least one processor is programmed to confirm that the first media file and the second media file are recordings of the same event by:
comparing audio recordings in the first media file and the second media file at corresponding time points; and
when a similarity in the audio recordings exceeds a threshold, confirming that the first media file and the second media file are recordings of the same event.

19. The device of claim 11, wherein the first metadata includes a description of the first subject, and the second metadata includes a description of the second subject, and the at least one processor is programmed to determine that the similarity exceeds the first threshold when the description of the first subject and the description of the second subject match.

20. The device of claim 11, wherein the at least one processor is programmed to:
instruct the display to display a preview of the first media file or the second media file.

* * * * *